United States Patent
Larson et al.

(10) Patent No.: US 11,138,211 B2
(45) Date of Patent: Oct. 5, 2021

(54) DETERMINING KEY CONTRIBUTORS FOR DOCUMENTS

(71) Applicant: MICROSOFT TECHNOLOGY LICENSING, LLC, Redmond, WA (US)

(72) Inventors: Jill Kathleen Larson, Bellevue, WA (US); Venkat Pradeep Chilakamarri, Seattle, WA (US); Rui Hu, Redmond, WA (US); Subash Kumar Bhamidipati, Issaquah, WA (US); Brian T. Albrecht, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 154 days.

(21) Appl. No.: 16/049,409

(22) Filed: Jul. 30, 2018

(65) Prior Publication Data

US 2020/0034442 A1    Jan. 30, 2020

(51) Int. Cl.
*G06F 16/2457* (2019.01)
*G06F 16/93* (2019.01)
*G06F 16/248* (2019.01)

(52) U.S. Cl.
CPC ...... *G06F 16/24578* (2019.01); *G06F 16/248* (2019.01); *G06F 16/93* (2019.01)

(58) Field of Classification Search
None
See application file for complete search history.

(56) References Cited

U.S. PATENT DOCUMENTS

| 7,849,399 | B2 | 12/2010 | Hoffmann |
| 8,458,196 | B1 | 6/2013 | Procopio |
| 8,645,396 | B2 | 2/2014 | McNally et al. |
| 9,589,072 | B2 | 3/2017 | Ray et al. |

(Continued)

FOREIGN PATENT DOCUMENTS

WO    2012012453 A2    1/2012

OTHER PUBLICATIONS

"International Search Report and Written Opinion Issued in PCT Application No. PCT/US2019/039641", dated Oct. 16, 2019, 13 Pages.

*Primary Examiner* — Christopher J Raab
(74) *Attorney, Agent, or Firm* — Newport IP, LLC; Scott Y. Shigeta

(57) ABSTRACT

A system for determining qualified contributors of a document is provided. A system can analyze user activities associated with a document to provide meaningful insights indicating the key contributors of the document based on a contributor policy. The contributor policy defines contribution factors and criteria that is used to determine when a user is deemed as a qualified contributor. The contribution factors can be used in an analysis of one or more user activities to determine a contribution score for each user associated with a document. The contribution scores of the users can be compared with a threshold to identify qualified contributors. The identified users are listed as qualified contributors of the document and associated with the document in the metadata. The contributor information can be utilized to inform readers of the document, identity expertise of these contributors, or recommend relevant documents to the contributors.

20 Claims, 9 Drawing Sheets

(56) References Cited

U.S. PATENT DOCUMENTS

| | | | |
|---|---|---|---|
| 9,594,756 B2 | 3/2017 | Sabharwal | |
| 2010/0174997 A1 | 7/2010 | O'sullivan et al. | |
| 2013/0117284 A1* | 5/2013 | Roozen | G06F 16/95 |
| | | | 707/748 |
| 2014/0081959 A1* | 3/2014 | Kass | G06Q 50/01 |
| | | | 707/723 |
| 2014/0222791 A1* | 8/2014 | Childress | G06F 16/953 |
| | | | 707/723 |
| 2015/0378997 A1 | 12/2015 | Becker et al. | |
| 2016/0314122 A1 | 10/2016 | Platakis et al. | |
| 2016/0371259 A1* | 12/2016 | Kohlmeier | G06F 16/93 |
| 2018/0129725 A1* | 5/2018 | Barkie | G06Q 10/101 |
| 2019/0272071 A1* | 9/2019 | Greenberger | G06F 40/169 |
| 2020/0098017 A1* | 3/2020 | Bhardwaj | G06Q 30/0278 |

\* cited by examiner

DETERMINING KEY CONTRIBUTORS FOR DOCUMENTS

BACKGROUND

Real-time online collaborative tools are becoming more popular. Nowadays, content of a single file is often edited by multiple users. For example, while user A is editing the text in a section of a document, user B might be editing the text of another section, and user C might be adding figures to the document. Although there are many benefits from systems that provide multiple-user editing sessions, this new way of working creates a new set of problems. For example, for a given document, it is difficult to find a person or group of people that are primarily responsible for the document contents. As a result, if a user has a question about the document, it may be difficult for that user to identify whom the question should be directed to. This issue may lead to a barrage of unnecessary emails or phone calls, which may not yield an accurate answer.

Some existing systems provide other methods for identifying contributors of a document. However, most existing systems don't provide actionable details. For example, a collaborative system might record data indicating that User A created and edited a file at 11:00 am on a first day; User B provided edits at 10:00 am on a second day; and User C provided edits at 2:00 pm on a third day. Such data does not provide useful insights to the user contributions. Thus, such features may not be helpful in accurately identifying a person or a group of people who may be able to answer specific questions about the document.

It is with respect to these and other considerations that the disclosure made herein is presented.

SUMMARY

The techniques disclosed herein enable systems to determine key contributors of a document. The system described herein can analyze user activities associated with a document to provide meaningful insights indicating the key contributors of the document. In some configurations, a contributor policy defines contribution factors and the criteria that is used to determine when a user is to be deemed as a key contributor. The contribution factors can be used in an analysis of one or more user activities to determine a contribution score for each user associated with a document. For instance, a system can generate contribution scores for contribution factors such as, but not limited to, a user's editing time of a user on the document, a quantity of data contributed to the document by the user, the type of the data provided by the user, etc. The contribution scores of the users can then be compared with a threshold to determine if a user qualifies as a key contributor, also referred to herein as a "qualified contributor." The identified users are listed as key contributors of the document and associated with the document in the metadata. The contributor information can be utilized to inform readers of the document, identity expertise of these qualified contributors, or recommend relevant documents to the qualified contributors.

In some embodiments, systems disclosed herein can analyze user activities associated with a document to identify and rank one or more qualified contributors of the document from multiple users. By generating contribution scores for each user who worked on the document, a ranked list of qualified contributors can be generated for the document. The list may include users that meet one or more thresholds, e.g., qualified contributors, and other users that have activities that may not meet the one or more thresholds.

The techniques disclosed herein can also cause the ranked list of qualified contributors to be presented to a reader of the document along with the document so that the reader can immediately identify key contributors thereby promoting collaboration. Traditional methods of finding key contributors of a document, such as emailing a group of users to asking about the contributors, does not rely on data indicating a granular level of user activities. Instead, the techniques presented herein not only eliminate or mitigate the communication between readers and authors/users, the techniques presented herein also provide a more accurate and consistent results about the contributors of the document.

By determining the key contributors of a document, a system can also provide valuable insights regarding the users who have worked on the document and made non-trivial contributions to the document. Further, the techniques disclosed herein can improve a number of efficiencies of document collaborating systems. For instance, when a system explicitly identifies the key contributors of a document, the access by other users to the document becomes more informed and unnecessary accesses can be reduced thereby saving the processing time, network bandwidth and energy of the system. From a user's perspective, when a system identifies key contributors of a document as described herein, a system can reduce or eliminate the need to present the raw data about user activities or other information related to the document. This would improve the user's interaction with a computer leading to the reduction of inadvertent inputs, based on which other efficiencies, including production efficiencies and network usage efficiencies, can improve.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
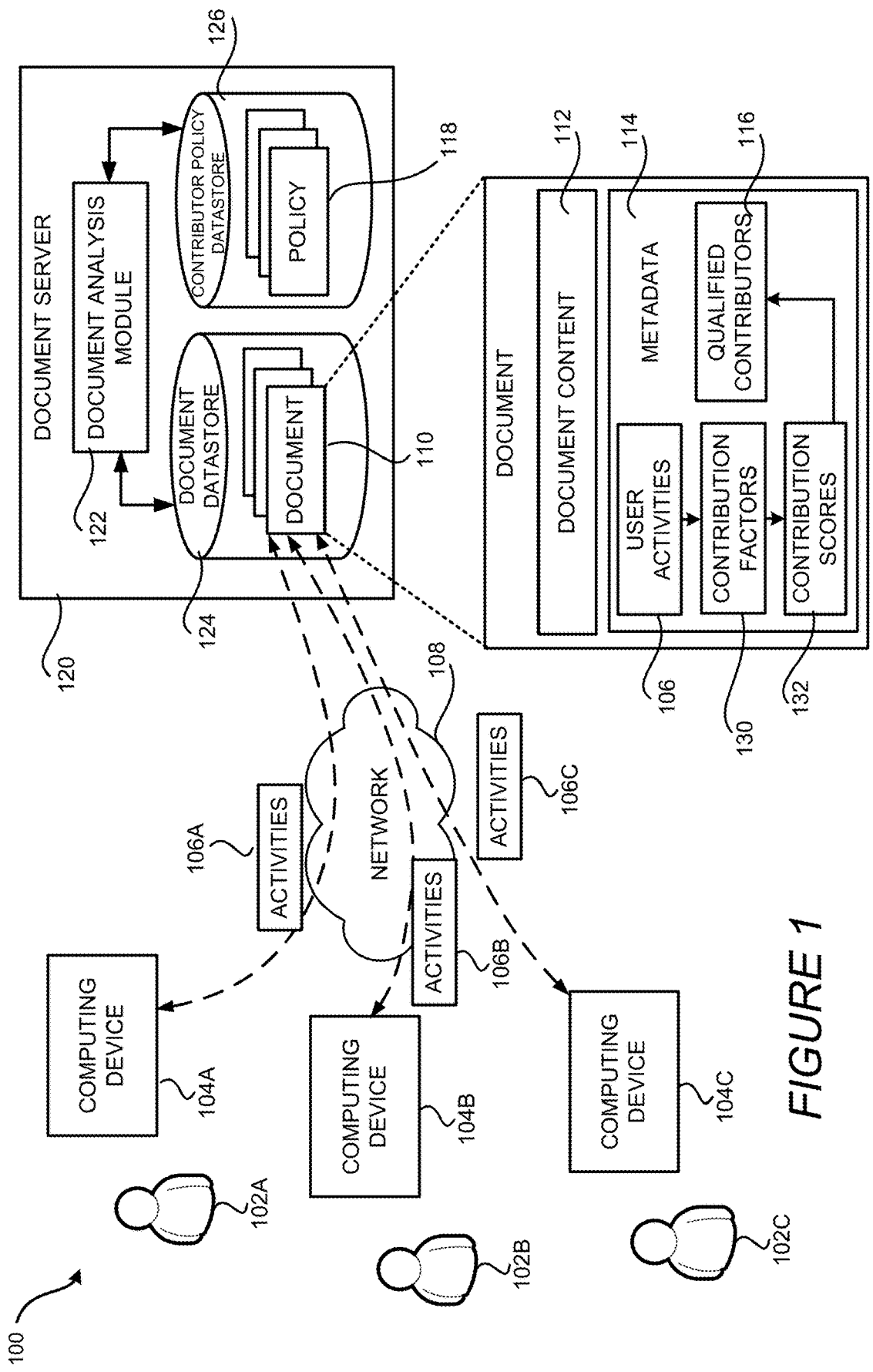
FIG. 1 is a block diagram of a system for determining a list of qualified contributors of a document.

The following Detailed Description discloses techniques and technologies for determining key contributors for a document. A key contributor of a document can be a user who has made valuable contribution to the document. Whether or not a user associated with a document can qualify as a key contributor can be defined in a contributor policy. The contributor policy may include contribution factors to be considered when determining a qualified contributor, weights of the corresponding contribution factors, and/or a mechanism to determine a qualified contributor utilizing the contribution factors.

The contribution factors for each user associated with the document can be analyzed based on the user activities performed on the document, such as creating the document, editing the document content, commenting on the document, finalizing the document, or proofreading the document. The document can have metadata associated therewith that describe the various user activities with regard to the document, such as the activity performed by a user on the document, the time when the activity is performed, and/or content associated with the user activity.

Based on the user activities and the contributor policy, contribution factors for each of the users can be determined and one or more contribution scores can be calculated. Contributor factors for a user of a document can include one or more of editing time of the user on the document, a type of edits provided by the user on the document, a quantity of data in the edits by the user, a frequency of edits by the user on the document, time spent on the document by the user, or a type of the user activity. Contribution scores can be derived based on the values of the contribution factors for the user and the contributor policy. The users can also be ranked according to their contribution scores, which can then be compared with the one or more criteria defined in the contributor policy to determine whether a user qualifies as a key contributor, e.g., a qualified contributor, of the document. Users who are determined to be the qualified contributors of the document can then be included in the list of qualified contributors of the document and be added to the metadata of the document.

The determined list of the qualified contributors can be presented to a reader of the document when the document is being displayed to that reader such that the reader can immediately identify the key contributors of the document and contact the corresponding contributor if the reader has a question about the document. The list of qualified contributors of the document can also be useful when a portion of the document is copied and pasted into another document. The metadata of the document that is relevant to the copied portion can also be copied along with the content and transferred to the new document. The qualified contributors of the copied portion will be automatically recognized as the qualified contributors of the corresponding portion in the new document. Thus, new metadata identifying qualified contributors an be generated for the new document in response to content being copied from another document.

The techniques disclosed herein can significantly enhance user experience. In one aspect, the techniques disclosed herein automatically provide the qualified contributors of a document when a reader or other individuals is reading or accessing the document, thereby eliminating the need of the reader or individuals to ask around to find out the qualified contributor of the content and also the number of unnecessary accesses to the document by the readers or individuals. This would save the processing time, network bandwidth and energy of the system. From a user's perspective, when a system identifies qualified contributors of a document as described herein, a system can reduce or eliminate the need to present the raw data about user activities or other information related to the document thereby saving the system's processing time and network bandwidth. It also improves a reader's interaction with a computer leading to the reduction of inadvertent inputs, and based on which other efficiencies, including production efficiencies and network usage efficiencies, can improve.

It should be appreciated that the above-described subject matter may be implemented as a computer-controlled apparatus, a computer process, a computing system, or as an article of manufacture such as a computer-readable storage medium. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for determining qualified contributors of a document are presented.

Referring now to FIG. 1, a system 100 is provided to illustrate aspects of the present disclosure. In this example, a system 100 can include a document server 120 containing a document analysis module 122 configured to determine a list of qualified contributors 116 for a document 110 stored in a document datastore 124. As shown in FIG. 1, the document 110 can include the document content 112, such as text, images, audio or videos. The document 110 can also include metadata 114 that describes the information about the document 110, such as the creation date of the document 110, the size of the document 110, the location of the document 110 in the storage of the document server 120, and so on.

Various users, such as users 102A-102C shown in FIG. 1 (which may be referred to herein collectively as the users 102 or individually as a user 102) can have access to the document 110 through their respective computing devices 104A-104C (which may be referred to herein collectively as computing devices 104 or individually as a computing device 104). The computing devices 104 can access the document 110 directly or through a network 108, which might be a local-area network ("LAN"), a wide-area network ("WAN"), the Internet, or any type of data communications network known in the art that enables communications with the document server 120.

The users 102 can be associated with the document 110 by performing various activities related to the document 110. Data defining the user activities 106A-106C (which may be referred to herein collectively as user activities 106 or individually as a user activity 106) can be processed by, and communicated between, the computing devices. For example, the user 102 might be a user who performed the activity of creating the document 110 on the document datastore 124, a user who performed the activity of editing the document content 112 of the document 110, a user who performed the activity of commenting on the document 110, a user who performed the activity of finalizing the document 110, or a user who performed the activity of proofreading the document 110. It should be appreciated that the user 102 can be any user or individual who has made contribution to any aspect of the document 110.

The user activities 106 performed by the users 102 can be monitored and recorded in the metadata 114 of the document 110. The user activities 106 recorded in the metadata 114 can include a number of attributes for each user activities 106, such as, the identification of the user 102 who performed the activity on the document 110, the type of the activity, a time stamp of the activity, data indicating an amount of time spent in performing the activity, a quantity of data applied to document through the activity and so on. Additional details regarding the user activities 106 will be provided below with regard to FIG. 2.

It should be appreciated that while FIG. 1 illustrates that the users 102 operate on the document 110 hosted on the document server 120, the document 110 can be hosted by another server or computing device when the users 102 perform the user activities 106. In other words, the document server 120 can be a server different from the server providing the editing environment for the document 110. The document 110 may be edited by the users 102 on another computing device and then be transmitted to the document server 120 to determine the qualified contributors.

The document server 120 can also include a contributor policy datastore 126 for storing various contributor policies 118. A contributor policy 118 defines one or more criteria for a user 102 associated with a document 110 to be considered as a qualified contributor 116 of the document 110. The contributor policy 118 can include contribution factors to be considered when determining a qualified contributor, weights of the corresponding contribution factors, and/or a mechanism to determine a qualified contributor utilizing the contribution factors.

Contribution factors 130 can be determined based on the recorded user activities 106 for the document 110. The contribution factors 130 can include attributes of user activities that are relevant to the determination of the qualified contributors of the document 110. For example, a contributor policy 118 might defines that the editing time of a user 102, the quantity of data contributed to the document 110 by the user 102, and the type of the data provided by the user 102 are the contribution factors 130 to be considered when determining whether the user 102 can be deemed as a qualified contributor 116 of the document 110. These contribution factors 130 can be determined based on the attributes of user activities 106 such as the start and end time of a user's editing session, the number of words typed in by the user, and the edited portion of the document.

The contribution factors derived from the user activities 106 can be further converted to a contribution score 132 for each user 102. According to one aspect of the implementation, a factor score can be derived for each of the contribution factors 130 and then an accumulative contribution score 132 can be determined for the user 102 based on the factor scores. Alternatively, or additionally, a contribution score 132 can be derived directly from the contribution factors 130.

The determined contribution score 132 for the user 102 can then be utilized to determine whether the user 102 is considered as a qualified contributor of the document 110. In one implementation, the contribution score 132 can be compared with a threshold score and if it exceeds the threshold score, the user 102 can be listed as a qualified contributor 116; otherwise, the user 102 is not considered as a qualified contributor 116. The above process can be repeated for each of the users 102 associated with the document 110 and a list of qualified contributors 116 may be determined. Additional details regarding the contributor policy 118 and the process of determining the list of qualified contributors 116 will be provided below with regard to FIGS. 3A, 3B, 4A, 4B and 5.

The determined list of qualified contributors 116 can be added to the metadata 114 of the document 110. The contribution factors 130 and/or the contribution scores 132 can also be added in the metadata 114. Alternatively, the contribution factors 130 and/or the contribution scores 132 can be discarded after the list of qualified contributors 116 have been determined in order to reduce the file size of the document 110 thereby saving storage space used to store the document 110 as well as the network bandwidth for transmitting the document 110 over the network.

The list of qualified contributors 116 can be utilized in various ways. For example, the list of qualified contributors 116 can be presented along with the document 110 whenever the document 110 is displayed to a reader such that the reader can immediately identify the key contributors of the document 110. If the reader has a question or would like to have further information regarding the document 110, she or he can contact the key contributors directly without spending time to searching for the key contributors of the document 110. The list of qualified contributors 116 can also be utilized along with the content or subject of the document 110 to determine the expertise of these qualified contributors 116. For example, if a user 102 is listed as the top contributor 116 of a document describing the technical details of an artificial intelligence ("AI") algorithm, the user 102 can be labeled as an expert in AI. Future questions or inquires related to AI can be directed to this specific user 102. Likewise, this information can also be utilized to recommend documents on similar topics that other people are working on to this user 102 based on his expertise or knowledge. For illustrative purposes, a qualified contributor 116 is also referred to herein as a "key contributor" or a "top contributor."

The list of qualified contributors 116 can also be attached to and transmitted along with the content 112 of the document 110 even if a portion of the content 112 is copied and pasted into another document. The attached information about qualified contributors 116 can speed up the process of determining qualified contributors 116 for the new document, thereby saving various computing resources.

It should be noted that in order to increase the accuracy of the determined qualified contributors 116, the above determining process can be performed in the granularity of sections or even paragraphs. In other words, instead of determining the qualified contributors 116 by analyzing the entire document content 112, the analysis on the user activities 106 and contribution factors 130 can be performed for each section or paragraph. As a result, each section or paragraph of the document 110 can have a list of qualified contributors 116 indicating the users 102 who have made non-trivial contributions to the corresponding section or paragraph. In the above example, the copied portion of the document 110 can have the list of qualified contributors 116 of the copied section or paragraph attached thereto, which would increase the accuracy of the determination of the list of qualified contributors 116 for the new document.

Figure 2:
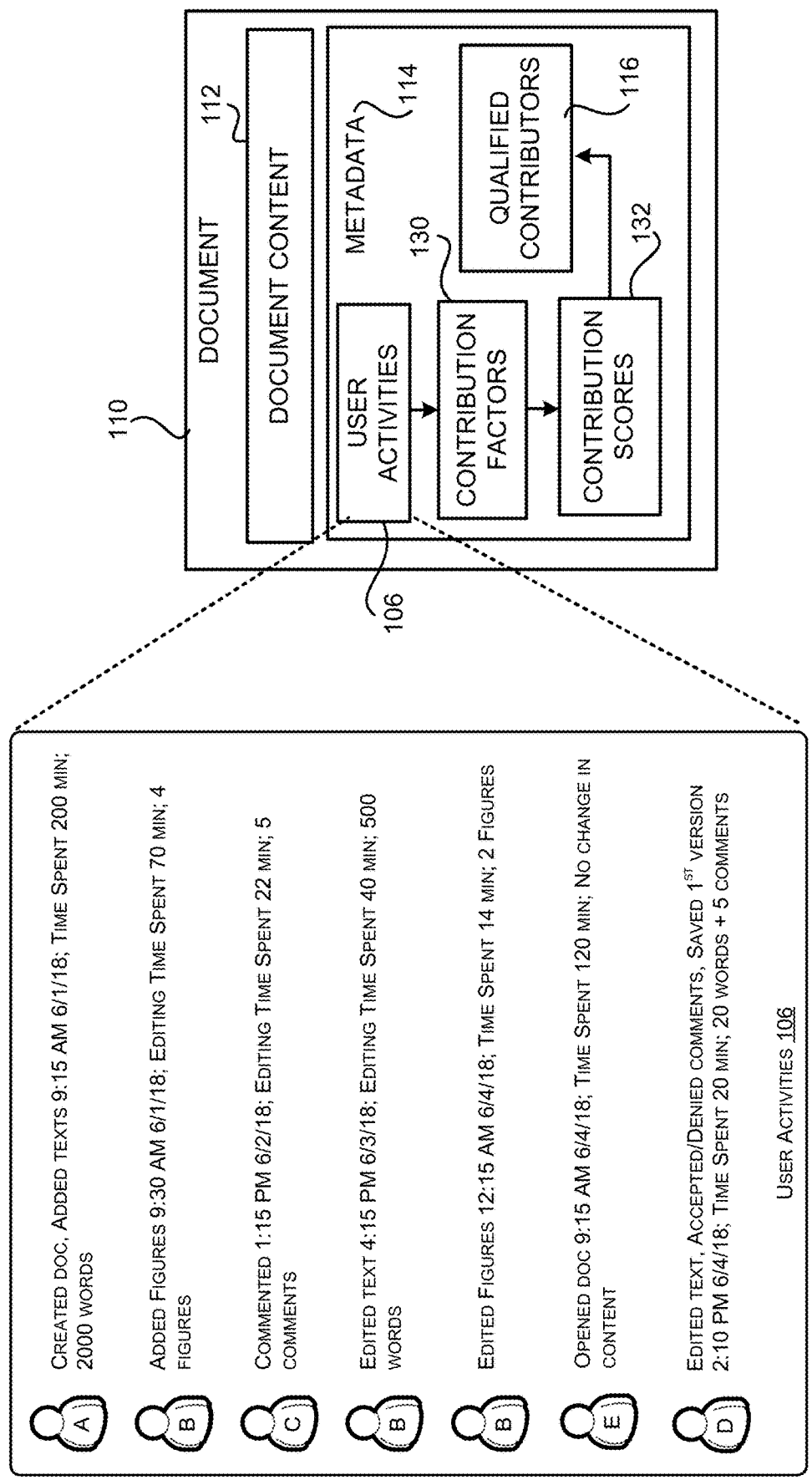
FIG. 2 is a set of sample user activities with regard to a document that can be processed by a system for determining the qualified contributors of a document.

Referring now to the example data set of FIG. 2, where a document 110 was edited by five users A, B, C, D and E. In this example, the metadata 114 associated with the document 110 recorded user activities 106 performed on the document 110 including the identification of the user 102 who performed the activity on the document 110, the type of the activity, a time stamp of the activity, data indicating an amount of time spent in performing the activity, a quantity of data applied to document through the activity. For example, the user activities 106 show that user A created the document 110 on Jun. 1, 2018 at 9:15 am, and he further added texts of 2000 words to the document 110. The time user A spent on the document 110 was 200 minutes. While user A was working on the document 110, user B added four figures to the document 110 starting from 9:30 am on Jun. 1, 2018 and he spent 70 minutes. User C then commented on the document 110 at 11:15 am on Jun. 2, 2018 and added five comments spending 22 minutes. User B again edited the text of the document 110 at 1:15 pm on Jun. 3, 2018 and changed 500 words within 40 minutes. User B then spent 14 minutes to edit the figures of the document 110 at 12:15 am on Jun. 4, 2018 changing two figures. User E opened the document 110 on Jun. 4, 2018 at 9:15 am to proofread the document. She spent 120 minutes on the document but made no changes to it. User D then cleaned up the document 110 by editing 20 words in the text of the document 110 and accepting or denying all five comments in the document. She finally saved the document as the first version.

It should be appreciated that the examples of user activities 106 given above are merely illustrative and that the user activities 106 might also encompass other types of activities performed by a user 102 while working on the document 110. In this regard, the term user activities 106 as utilized herein encompass any activities taken by a user 102 with respect to the document 110. In addition, other attributes of the user activities 106 other than shown in FIG. 2 may be monitored and recorded by the document server 120 or any other server hosting the document 110 when it is being edited.

As described above, the user activities 106 can be analyzed to determine a list of qualified contributors 116 of the document 110 according to the contributor policy 118 governing the document 110. FIG. 3A illustrates a data structure diagram showing a number of data elements stored in a data structure for a contributor policy 118. As shown in FIG. 3A, the contributor policy 118 can include a set of contribution factors 130 to be considered when determining the qualified contributors 116 of the document 110 and weights assigned to the contribution factors 130. In some scenarios, different contribution factors 322 may have different importance in the determination of the qualified contributors 116 and thus are assigned different weights. In other cases, the contribution factors 322 can carry equal weight in the determination and thus are assigned the same weight 324. In addition, the contributor policy 118 can specify a mechanism 326 for determining a contribution score 132 for each user. For example, the mechanism 326 can specify that the contribution score 132 can be determined by determining a factor score for each of the contribution factors 322 and then calculating an accumulative score from those factor scores. Alternatively, the mechanism 326 can specify that a contribution score 132 can be derived directly from the contribution factors 130 by applying a linear or non-linear function. Various other ways of calculating the contribution score 132 can be utilized.

The contributor policy 118 can further include a threshold score 328 and if the contribution score 132 of a user 102 meets the threshold score 328, the user 102 can be considered as a qualified contributor 116 of the document 110. In other words, those users 102 whose contribution scores 132 exceed the threshold score 328 will be determined as the qualified contributors 116 of the document 110. However, there might be situations where the contribution score 132 of a user 102 does not exceed the threshold score 328, but the user 102 may still be considered as a qualified contributor 116. For example, a user 102 who finalizes the document 110 by accepting changes or comments made by others and saves a version of the document 110, such as user D in FIG. 2, can be treated as an owner of the document and can be classified as a qualified contributor 116. However, such a user might not have spent much time on the document nor made a lot of edits to the content of the document 110. As such, his contribution score 132 might not meet the threshold score 328. In such a scenario, the contributor policy 118 can specify one or more exceptions 330 to the general rule of meeting the threshold score 328 so that the user 102 can still be considered as a qualified contributor 116 even though his contribution score 132 does not exceed the threshold score 328.

The contributor policy 118 can be specified by an author of the document 110 or by an entity that owns the document 110, such as a company or an organization. For example, the first author of the document 110 can define in the contributor policy 118 how a user can qualify as a qualified contributor according to his or her preference. Similarly, a company can define its own contributor policy 118 based on the company's business goals or other policies. If there is no contributor policy 118 defined by an author or an entity, the contributor policy datastore 126 can provide a default contributor policy 118. For example, the default contributor policy 118 can be generated automatically based on general understanding of a qualified contributor, such as a user who contributed a large portion of content to the document, has long editing time, or has reviewed and finally approved the document 110.

It should be appreciated that the data structure diagram presented in FIG. 3A is for illustration only and should not be construed as limiting. Additional data elements may be defined by the author or the entity to be included in the contributor policy 118 beyond those described herein, and that not every data element described herein will be included in every contributor policy 118.

Figure 3B:
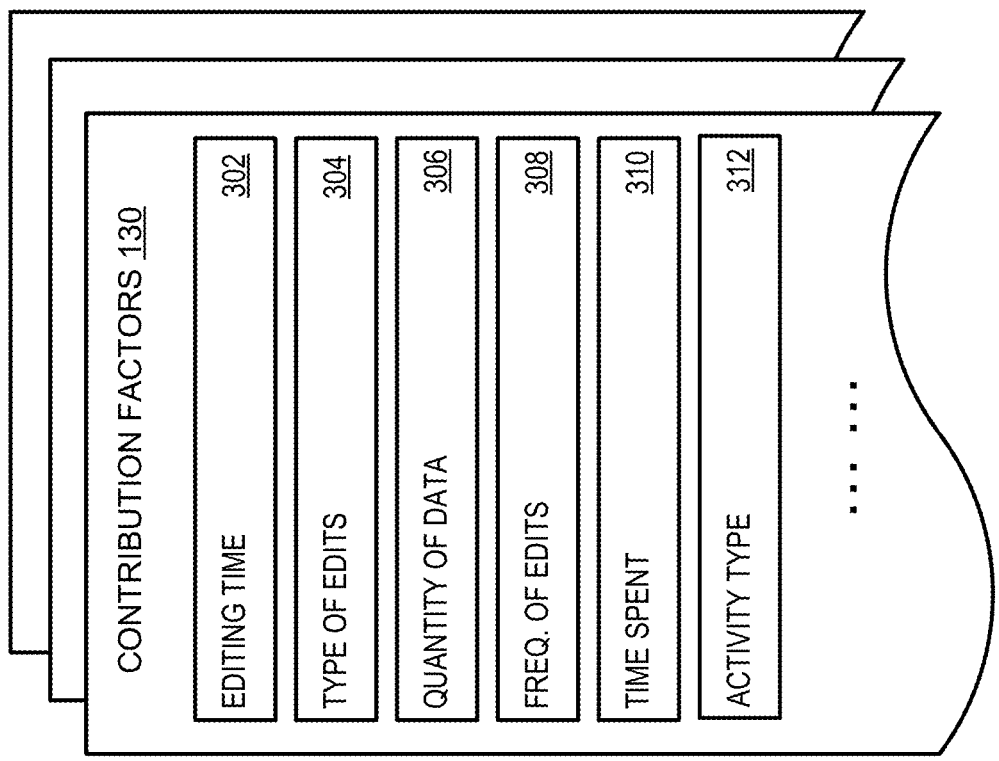
FIG. 3B is a data structure diagram showing a number of data elements stored in a data structure for contribution factors of a user.
Figure 3A:
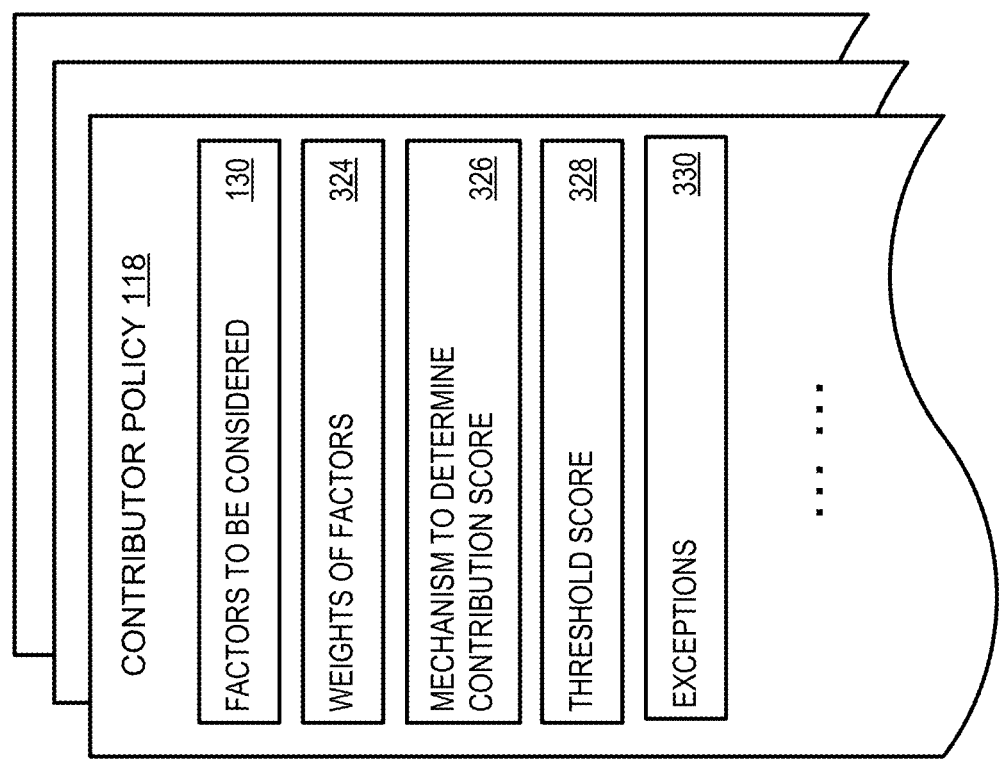
FIG. 3A is a data structure diagram showing a number of data elements stored in a data structure for a contributor policy.

FIG. 3B illustrates a data structure diagram showing a number of data elements stored in a data structure for contribution factors 130. The contribution factors 130 can include editing time 302 indicating the amount of time spent by a user 102 in editing the document 110. The editing time 302 can be determined from the user activities 106 based on the types of user activity 106. In one example, the editing time 302 can be based on a time period the document 110 is opened for editing by an application, such as Word, Excel, Google Docs, Sheets, Photoshop, etc. In another example, the editing time 302 may be measured to include the time period when the user is actively editing the document but does not include the time period when the user is idle. These examples are provided for illustrative purposes and are not to be construed as limiting. Other mechanisms for measuring the editing time 302 of a user 102 on a document 110 can be utilized with the techniques disclosed herein.

The contribution factors 130 can also include a factor indicating the type of the edits 304. This factor is useful when the document 110 contains a variety of types of content, such as texts, figures, equations, audio or even video, and the contribution to a certain type of content is more valuable than other types of content. As such, it would be helpful to use the type of edits as a factor when determining the qualified contributors 116. For example, if figures showing experimental results of a new technique are more important than the texts describing the technique, then the contributor policy 118 can set the type of the edits 304 as a contribution factor. On the other hand, if a document only contains texts and figures and they are equally important, it might not be efficient to user the type of the edits 304 as a contribution factor 130.

Another contribution factor 130 that can be included is the quantity of data 306 applied to edits of the document 110 by a user 102. The quantity of data 306 can be measured based on a range of different types of user activities 106. In one example, the quantity of data 306 can be an absolute number with respect to data that is applied to, and removed from, a document 110. For instance, if a user 102 edits a file and adds 4 KB of text, the quantity of data 306 applied to the edits of the document is 4 KB. In another example, the quantity of data 306 can be measured by the number of words added or removed or changed in the text of the document 110 if the edits are applied to the text. If the edits are applied to the figures of the document 110, the quantity of data 306 can be measured in terms of the number of figures being edited. Similarly, if the edits are comments added or removed, the quantity of data 306 can be measured in terms of the number of comments changed. Typically, the larger the quantity of data 306 edited by a user 102 is, the more likely that the user 102 be determined as a qualified contributor 116 of the document 110.

It should be noted that these examples are provided for illustrative purposes and are not to be construed as limiting. Other mechanisms for measuring the quantity of data 306 applied to the edits of the document 110 can be utilized with the techniques disclosed herein. For example, different types of edits can employ different types of measuring mechanisms. By way of example, and not limiting, edits to the text portion of document 110 can be measured based on the number of words changed, whereas the edits to the figures of the document 110 can be measured using the amount of absolute changes in the size of the document 110, such as 1 MB of changes in figures.

The contribution factors 130 can also include the frequency of edits 308 which indicates a frequency that a user 102 edited the document 110 and time spent 310 by a user 102 on the document 110. Generally, the more often the user 102 edited the document 110, the user 102 is more likely considered as a qualified contributor 116. Likewise, the longer the user 102 worked with the document 110, the more likely the user is considered as a qualified contributor 116. It should be noted that the time spent 310 is different from the editing time 302. In some implementations, the editing time 302 measures the time when the user 102 is editing the document 110, whereas the time spent 310 measure the time the user 102 spent on the document 110 regardless of his or her activity. As such, the time period when a user 102 opens the document for proofreading would be counted toward the time spent 310, but not the editing time 302 if no changes were made.

The contribution factors 130 can also include a factor indicating an activity type 312 of the user 102. For example, the activity type 312 can be editing, commenting, proofreading, approving, or saving. A user having an activity with the activity type of proofreading would be less likely to be considered as a qualified contributor than a user having an activity type of approving. As such, the action type 312 can be a factor considered when determining the qualified contributors 116 for the document 110.

It should be appreciated that although the above disclosure describes that the contributor policy 118 specifies the contribution factors 130 to be consideration during the determination process, the contribution factors 130 can determined independent of the contributor policy 118. For example, the document analysis module 122 can analyze the document 110 to determine a set of contribution factors 130 that are commonly used when determining the qualified contributors 116 without referring to any particular contributor policy 118. When identifying the qualified contributors 116 for a document 110 based on a specific contributor policy 118, the document analysis module 122 can select those contribution factors 130 that are specified in the contributor policy 118 to perform the determination process.

Figure 4A:
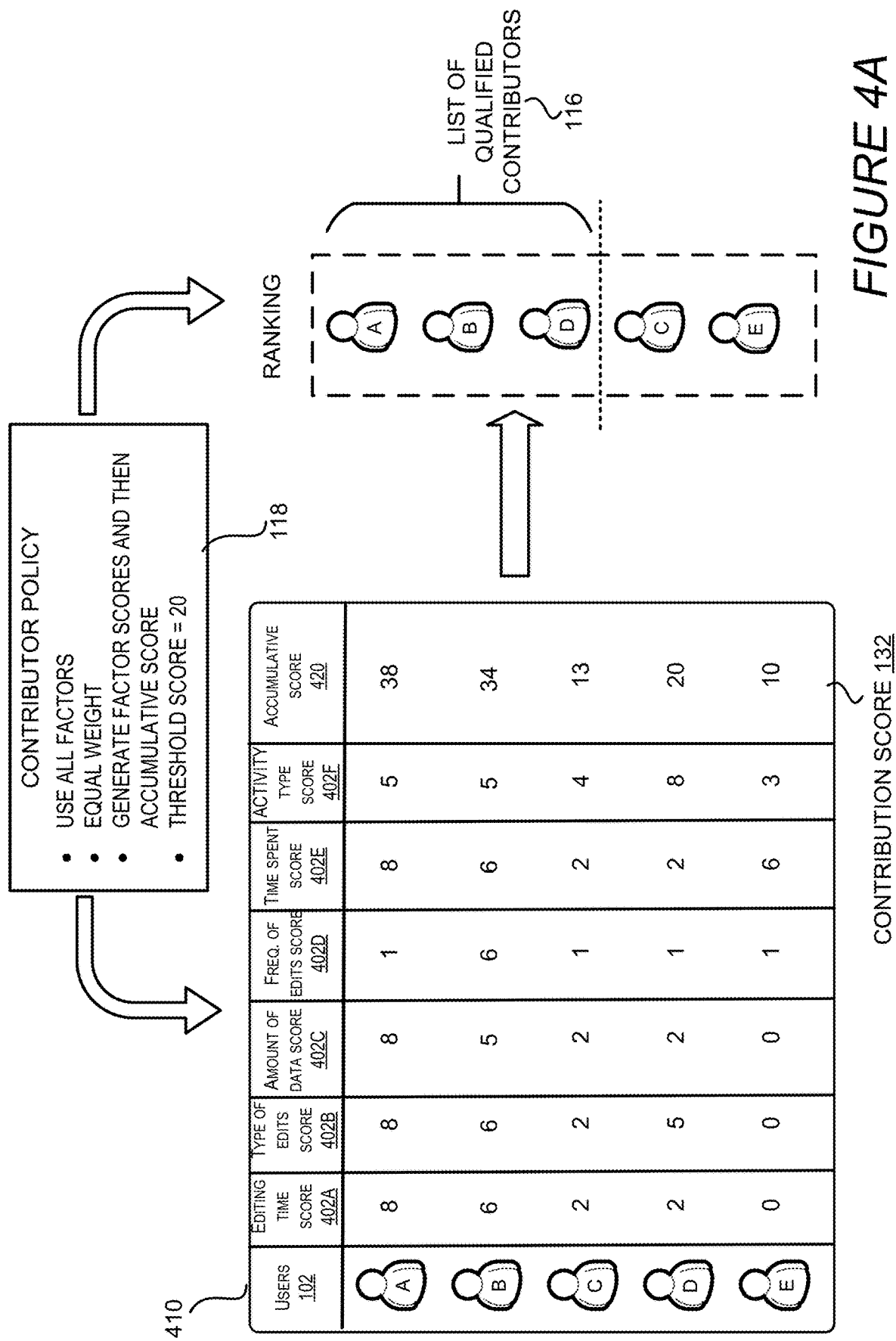
FIG. 4A is a sample data set that shows contribution scores generated by the system for determining qualified contributors of a document based on the sample user activities shown in FIG. 2.
Figure 4B:
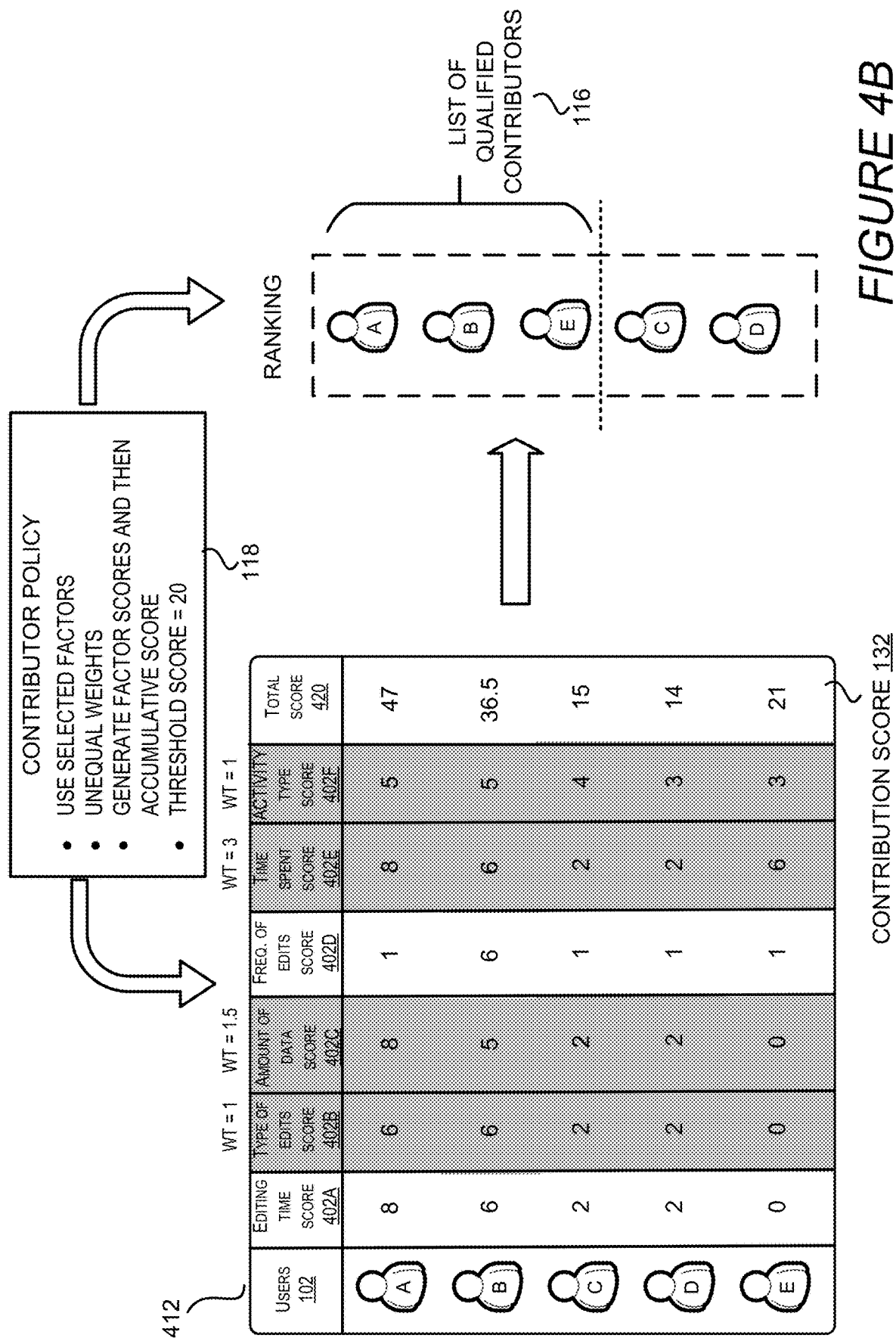
FIG. 4B is another sample data set that shows contribution scores generated by the system for determining qualified contributors of a document based on the sample user activities shown in FIG. 2.

Referring now to the examples of FIGS. 4A and 4B, where the determination process is illustrated for two different contributor policies 118. Both examples are based on the user activities 106 shown in FIG. 2. In the example of FIG. 4A, the contributor policy 118 instructs that all the contribution factors 130 listed in FIG. 3B are to be used in the determination process, and equal weight is applied to those contribution factors 130. The contribution scores 132 should be derived by generating individual factor scores for the contribution factors 130 and then an accumulative score. In addition, the threshold score 328 is set to be 20.

Based on this contributor policy 118, the factor scores 402A-402F for users A-E are listed in the table 410. In the table 410, the factor scores 402 of the contribution factors 130 for each of the users A-E is determined based on the attribute values of the user activities 106 for individual users 102. For example, the contributor policy 118 can specify, in the mechanism 326 for determining a contribution score of each user, a method for quantizing the attribute values of the user activities 106 into the corresponding factor scores 402. Then an accumulative score 420, i.e. the contribution score 132, for each user can be generated using the individual factor scores 402.

Because the contributor policy 118 shown in FIG. 4A indicates that equal weight should be applied to all contribution factors 130, the accumulative score 420 can be determined to be the sum of all the factor scores 402 for the corresponding user. The accumulative score 420, i.e. the contribution score 132, of each user is then compared with the threshold score of 20. Those users whose contribution score 132 is higher than the threshold score 328 will be determined to be the qualified contributors 116 of the document 110. According to one aspect of the implementation, the users can be ranked according to their contribution scores 132 before applying the score threshold 328. In that way, the output qualified contributors 116 is also a ranked list where the user who contributed the most according to the contributor policy 118 will be listed on top of the list.

In the example shown in FIG. 4A, users A and B are the top two qualified contributors 116 for the document 110 mainly because of their large amount of editing time and quantity of data. User D is also labeled as a qualified contributor 116 because the contributor policy 118 defines that his activity of approving the document and saving it in a major version number indicates that user D is an owner of the document 110 and should be considered as a qualified contributor 116. As such, the activity type score of user D is high, thereby boosting his accumulative score 420 to pass the threshold score 328. It should be noted that instead of assigning a high factor score to the approving type of activity, the contributor policy 118 can also set up an exception 330 to instruct the system to determine users such as user D as qualified contributors of the document 110.

In the example shown in FIG. 4B, user D is no longer identified as a qualified contributor and is replaced by user E. This is due to the change of the contributor policy 118. In the second contributor policy 118, only a subset of the contribution factors 130 are considered. Other factors including editing time 302 and frequency of edits 308 are not considered. In addition, the time spent factor 310 is given much higher weight than other factors, and as a result, user E has a higher accumulative score 420 than it had in FIG. 4A. Further, the contributor policy 118 in FIG. 4B does not value the activity of cleaning up and approving the document 110, and thus user D has a lower score on the activity type factor 312 than he had in FIG. 4A. These changes in the contributor policy 118 lead to a different set of qualified contributors 116 in FIG. 4B. It is worth mentioning that, in FIG. 4B, user E can be considered as a qualified contributor 116 even though she did not make any edits to the document 110. As can be seen, an individual or an entity can achieve the desired result of the qualified contributors of a document by adjusting the contributor policy 118 based on his or its preferences.

It should be understood that examples shown in FIGS. 4A and 4B are merely illustrative and should not be construed as limiting. Various sets of contribution factors 130, weighting schemes and/or mechanisms for determining contribution scores 132 can be utilized to determine the qualified contributors 116 according to the preference of the individual or the entity that defines the contributor policy 118. For example, if the policy setting individual or entity values the contribution to the content of the document 110 more than other types of contribution, then the contribution factors of editing time 302 and the quantity of data 306 should be considered, and be assigned a higher weight if a weighted score is to be calculated. In addition, activity type 312 of editing should be considered, and assigned a higher score and/or given higher weight than other types of activities.

Figure 5:
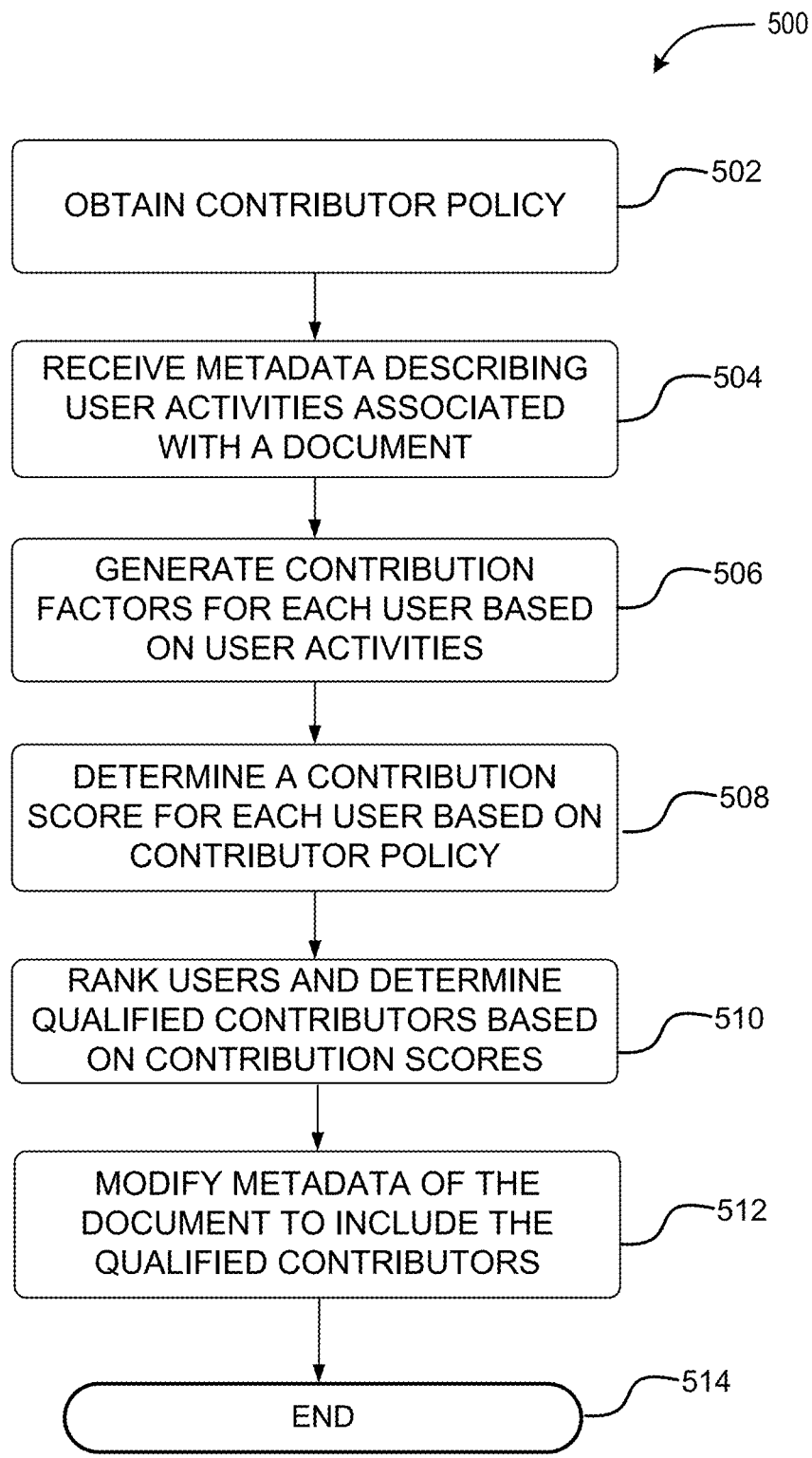
FIG. 5 is a flow diagram showing aspects of a routine for enabling the techniques disclosed herein.

Turning now to FIG. 5, aspects of a routine 500 for determining qualified contributors 116 for a document 110 are shown and described below. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 are described herein as being implemented, at least in part, by modules running the features disclosed herein can be a dynamically linked library (DLL), a statically linked library, functionality produced by an application programming interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 5, the routine 500 begins at operation 502 where the document analysis module 122 receives, obtains, or otherwise accesses a contributor policy 118 for a document 110 for which one or more qualified contributors are to be determined. The document 110 can have more than one user 102 associated therewith. For example, the users 102 can include individuals who has created, edited, commented, or accessed the documents. The contributor policy 118 defines the criteria for a user associated with the document 110 to be considered as a qualified contributor of the document 110. The contributor policy 118 can be received directly from the individual or entity defining the contributor policy 118 through a user interface presented on the document server 120 or other computing device. Alternatively, the contributor policy 118 can be received previously and stored in the contributor policy datastore 126, and the document analysis module 122 can access the contributor policy 118 from the contributor policy datastore 126.

The routine 500 then proceeds to operation 504 where the document analysis module 122 receives metadata 114 of the document 110 that contains user activities 106 associated with the document 110, such as creating the document, editing the document content, commenting on the document, finalizing the document, or proofreading the document. The metadata 114 can include data describing a number of attributes for each user activities 106, such as, the identification of the user 102 who performed the activity 106 on the document 110, the type of the activity 106, a time stamp of the activity 106, data indicating an amount of time spent in performing the activity, a quantity of data applied to document through the activity 106 and so on.

The routine 500 then proceeds to operation 506 where the document analysis module 122 can generate contribution factors 130 for each user 102 based on the user activities 106. The contribution factors 130 can include one or more of editing time of the user 102, the type of edits 304 provided by the user 102, the quantity of data 306 in the edits, the frequency of edits by the user, time spent on the document by the user, an activity type 312 of the user, and others. The contribution factors 130 to be generated can be specified in the contributor policy 118 defined by an individual or an entity or in a default contributor policy 118. The values of the contribution factors 130 can be determined based on the attributes of the user activities 106.

From operation 506, the routine 500 proceeds to operation 508 where the document analysis module 122 can convert the values of contribution factors 130 for each user 102 to a contribution score 132. In one implementation, a factor score is determined for each of the contribution factors 130 and then an accumulative score can be obtained from these factor scores. The contributor policy 118 can define how to convert the value of the contribution factors 130 into the factor scores and how the accumulative score can be derived from the factor scores. For example, the contributor policy 118 might assign different weights to different contribution factors and specify that the accumulative score should be obtained as a weighted sum of the factor scores. Alternatively, the accumulative score can be obtained from the factor scores without applying weights or by applying equal weights. Other methods of obtaining a contribution score 132 can be utilized.

From operation 508, the routine 500 proceeds to operation 510 where the users can be ranked according to their contribution scores 132. The contribution score 132 of each user can also be compared with a threshold score 328 defined in the contributor policy 118 to determine if the user can be determined as a qualified contributor 116. Those users 102 whose contribution scores 132 exceed the threshold score 328 can be considered as the qualified contributors 116 of the document 110. The routine 500 then proceeds to operation 512 where a list of these qualified contributors 116 can be added to the metadata 114 of the document 110 and be associated with the document 110. From operation 512, the routine 500 proceeds to operation 514, where it ends.

Figure 6:
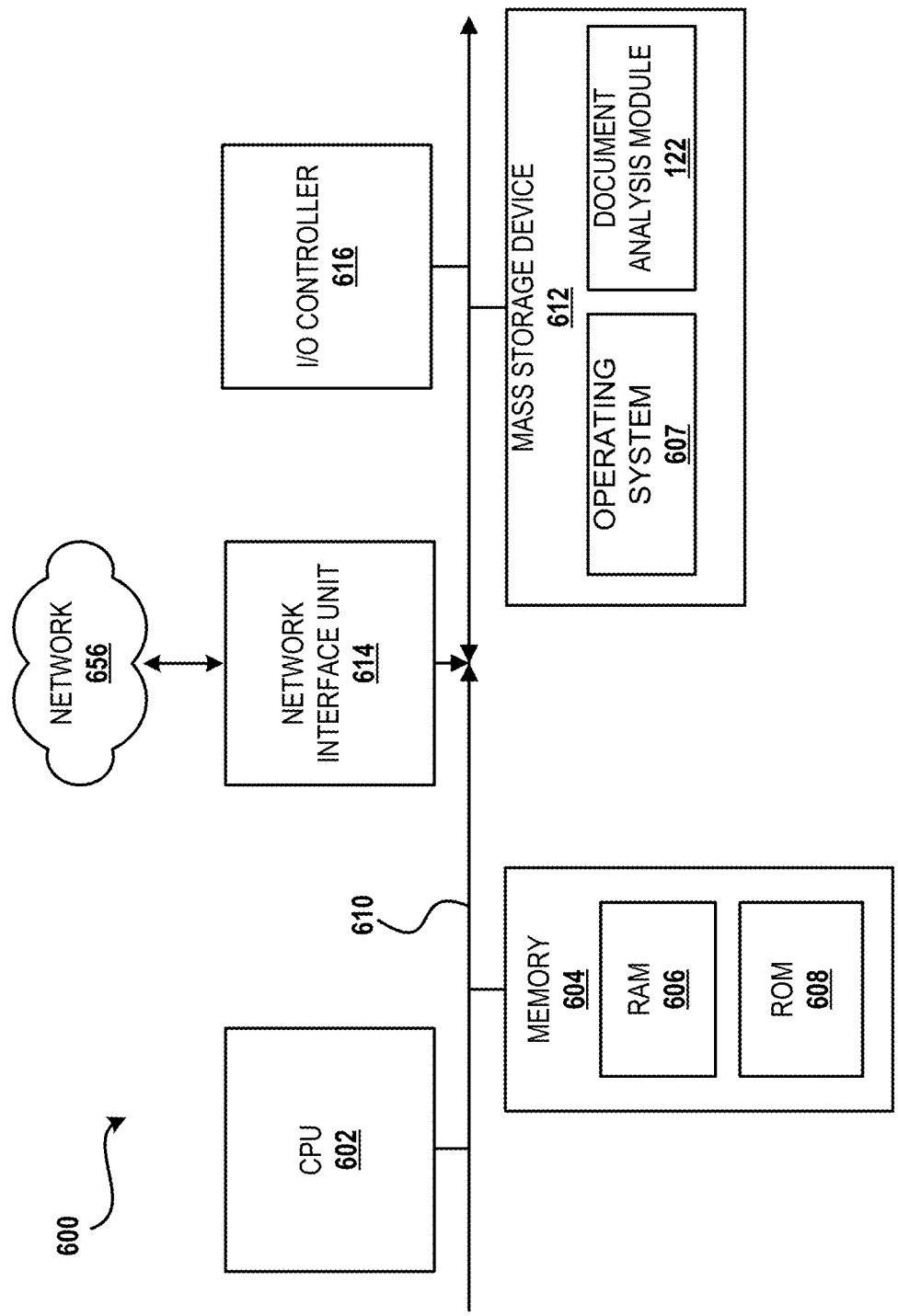
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a computer, such as the document server 120 (FIG. 1), capable of executing the program components described herein. Thus, the computer architecture 600 illustrated in FIG. 6 illustrates an architecture for a server computer, a mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 607, other data, and one or more applications, such as the document analysis module 122.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various configurations, the computer architecture 600 may operate in a networked environment using logical connections to remote computers through the network 656 and/or another network (not shown). The computer architecture 600 may connect to the network 656 through a network interface unit 614 connected to the bus 610. It should be appreciated that the network interface unit 614 also may be utilized to connect to other types of networks and remote computer systems. The computer architecture 600 also may include an input/output controller 616 for receiving and processing input from a number of other devices, including a keyboard, mouse, or electronic stylus (not shown in FIG. 6). Similarly, the input/output controller 616 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Figure 7:
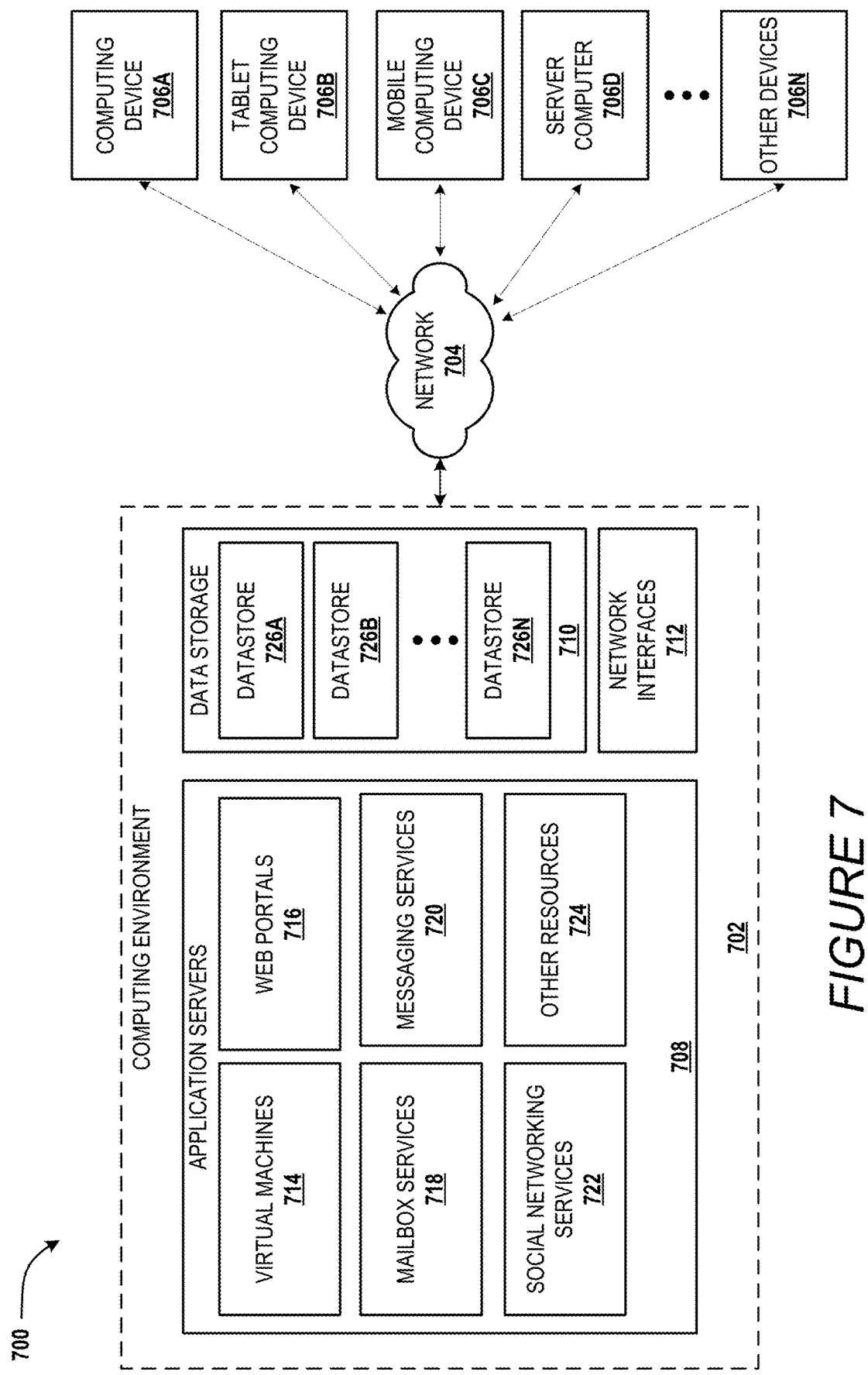
FIG. 7 is a diagram illustrating a distributed computing environment capable of implementing aspects of the techniques and technologies presented herein.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

According to various implementations, the distributed computing environment 700 includes a computing environment 702 operating on, in communication with, or as part of the network 704. The network 704 may be or may include the network 656, described above with reference to FIG. 6. The network 704 also can include various access networks. One or more client devices 706A-706N (hereinafter referred to collectively and/or generically as "clients 706" and also referred to herein as computing devices 106) can communicate with the computing environment 702 via the network 704 and/or other connections (not illustrated in FIG. 7). In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702. Two example computing architectures for the clients 706 are illustrated and described herein with reference to FIGS. 5 and 7. It should be understood that the illustrated clients 706 and computing architectures illustrated and described herein are illustrative, and should not be construed as being limited in any way.

In the illustrated configuration, the computing environment 702 includes application servers 708, data storage 710, and one or more network interfaces 712. According to various implementations, the functionality of the application servers 708 can be provided by one or more server computers that are executing as part of, or in communication with, the network 704. The application servers 708 can host various services, virtual machines, portals, and/or other resources. In the illustrated configuration, the application servers 708 host one or more virtual machines 714 for hosting applications or other functionality. According to various implementations, the virtual machines 714 host one or more applications and/or software modules for enabling smart versioning of files. It should be understood that this configuration is illustrative, and should not be construed as being limiting in any way. The application servers 708 also host or provide access to one or more portals, link pages, Web sites, and/or other information ("Web portals") 716.

According to various implementations, the application servers 708 also include one or more mailbox services 718 and one or more messaging services 720. The mailbox services 718 can include electronic mail ("email") services. The mailbox services 718 also can include various personal information management ("PIM") and presence services including, but not limited to, calendar services, contact management services, collaboration services, and/or other services. The messaging services 720 can include, but are not limited to, instant messaging services, chat services, forum services, and/or other communication services.

The application servers 708 also may include one or more social networking services 722. The social networking services 722 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 722 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 722 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 722 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 722 are not mentioned herein for the sake of brevity. As such, the above configurations are illustrative, and should not be construed as being limited in any way. According to various implementations, the social networking services 722 may host one or more applications and/or software modules for providing the functionality described herein, such as enabling smart versioning of files. For instance, any one of the application servers 708 may communicate or facilitate the functionality and features described herein. For instance, a social networking application, mail client, messaging client or a browser running on a phone or any other client 706 may communicate with a networking service 722 and facilitate the functionality, even in part, described above with respect to FIG. 7. Any device or service depicted herein can be used as a resource for supplemental data, including email servers, storage servers, etc.

As shown in FIG. 7, the application servers 708 also can host other services, applications, portals, and/or other resources ("other resources") 724. The other resources 724 can include, but are not limited to, document sharing, rendering or any other functionality. It thus can be appreciated that the computing environment 702 can provide integration of the concepts and technologies disclosed herein with various mailbox, messaging, social networking, and/or other services or resources.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more server computers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the application servers 708 and/or other data. Although not illustrated in FIG. 7, the datastores 726 also can host or store web page documents, word documents, presentation documents, data structures, algorithms for execution by a recommendation engine, and/or other data utilized by any application program or another module. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects. In one specific example, as summarized above, techniques described herein may be implemented, at least in part, by web browser application, which works in conjunction with the application servers 708 of FIG. 7.

Figure 8:
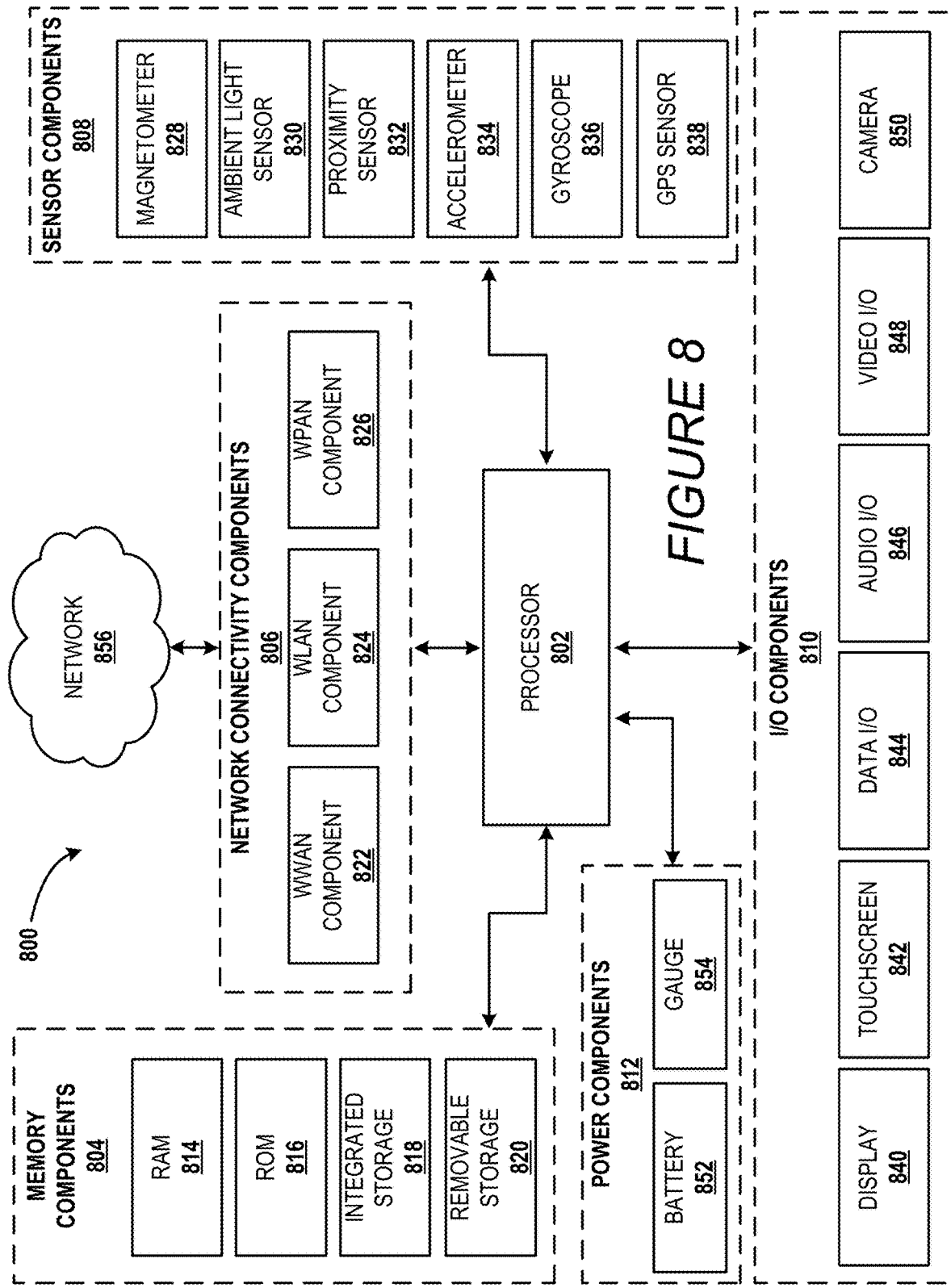
FIG. 8 is a computer architecture diagram illustrating a computing device architecture for a computing device capable of implementing aspects of the techniques and technologies presented herein.

Turning now to FIG. 8, an illustrative computing device architecture 800 for a computing device that is capable of executing various software components described herein for enabling smart versioning of files. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 800 is applicable to any of the computing devices shown in FIG. 1 and FIG. 7. Moreover, aspects of the computing device architecture 800 may be applicable to traditional desktop computers, portable computers (e.g., phones, laptops, notebooks, ultra-portables, and netbooks), server computers, and other computer systems, such as described herein with reference to FIG. 1 and FIG. 7. For example, the single touch and multi-touch aspects disclosed herein below may be applied to desktop computers that utilize a touchscreen or some other touch-enabled device, such as a touch-enabled track pad or touch-enabled mouse.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individuals components illustrated in FIG. 8, the components can interact to carry out device functions. In some configurations, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 802 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some configurations, the processor 802 is fabricated, in part, utilizing a package-on-package ("PoP") integrated circuit packaging technique. The processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a random access memory ("RAM") 814, a read-only memory ("ROM") 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 and/or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available as a total combined storage capacity. In some configurations, the total combined capacity of the integrated storage 818 and the removable storage 820 is shown to a user instead of separate storage capacities for the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from the network 856 or another network, which may be a WWAN, a WLAN, or a WPAN. Although only the network 856 is illustrated, the network connectivity components 806 may facilitate simultaneous communication with multiple networks, including the network 604 of FIG. 6. For example, the network connectivity components 806 may facilitate simultaneous communications with multiple networks via one or more of a WWAN, a WLAN, or a WPAN.

The network 856 may be or may include a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 856 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 856 may be configured to provide voice and/or data communications with any combination of the above technologies. The network 856 may be configured to or adapted to provide voice and/or data communications in accordance with future generation technologies.

In some configurations, the WWAN component 822 is configured to provide dual-multi-mode connectivity to the network 856. For example, the WWAN component 822 may be configured to provide connectivity to the network 856, wherein the network 856 provides service via GSM and UMTS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 856 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 856 via the WI-FI access points. Such connections may be secured via various encryption technologies including, but not limited, WI-FI Protected Access ("WPA"), WPA2, Wired Equivalent Privacy ("WEP"), and the like.

The network 856 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 828, an ambient light sensor 830, a proximity sensor 832, an accelerometer 834, a gyroscope 836, and a Global Positioning System sensor ("GPS sensor") 838. It is contemplated that other sensors, such as, but not limited to, temperature sensors or shock detection sensors, also may be incorporated in the computing device architecture 800.

The magnetometer 828 is configured to measure the strength and direction of a magnetic field. In some configurations the magnetometer 828 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 828 are contemplated.

The ambient light sensor 830 is configured to measure ambient light. In some configurations, the ambient light sensor 830 provides measurements to an application program stored within one the memory components 804 in order to automatically adjust the brightness of a display (described below) to compensate for low-light and high-light environments. Other uses of measurements obtained by the ambient light sensor 830 are contemplated.

The proximity sensor 832 is configured to detect the presence of an object or thing in proximity to the computing device without direct contact. In some configurations, the proximity sensor 832 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 832 are contemplated.

The accelerometer 834 is configured to measure proper acceleration. In some configurations, output from the accelerometer 834 is used by an application program as an input mechanism to control some functionality of the application program. For example, the application program may be a video game in which a character, a portion thereof, or an object is moved or otherwise manipulated in response to input received via the accelerometer 834. In some configurations, output from the accelerometer 834 is provided to an application program for use in switching between landscape and portrait modes, calculating coordinate acceleration, or detecting a fall. Other uses of the accelerometer 834 are contemplated.

The gyroscope 836 is configured to measure and maintain orientation. In some configurations, output from the gyroscope 836 is used by an application program as an input mechanism to control some functionality of the application program. For example, the gyroscope 836 can be used for accurate recognition of movement within a 3D environment of a video game application or some other application. In some configurations, an application program utilizes output from the gyroscope 836 and the accelerometer 834 to enhance control of some functionality of the application program. Other uses of the gyroscope 836 are contemplated.

The GPS sensor 838 is configured to receive signals from GPS satellites for use in calculating a location. The location calculated by the GPS sensor 838 may be used by any application program that requires or benefits from location information. For example, the location calculated by the GPS sensor 838 may be used with a navigation application program to provide directions from the location to a destination or directions from the destination to the location. Moreover, the GPS sensor 838 may be used to provide location information to an external location-based service, such as E911 service. The GPS sensor 838 may obtain location information generated via WI-FI, WIMAX, and/or cellular triangulation techniques utilizing one or more of the network connectivity components 806 to aid the GPS sensor 838 in obtaining a location fix. The GPS sensor 838 may also be used in Assisted GPS ("A-GPS") systems. The GPS sensor 838 can also operate in conjunction with other components, such as the processor 802, to generate positioning data for the computing device 800.

The I/O components 810 include a display 840, a touchscreen 842, a data I/O interface component ("data I/O") 844, an audio I/O interface component ("audio I/O") 846, a video I/O interface component ("video I/O") 848, and a camera 850. In some configurations, the display 840 and the touchscreen 842 are combined. In some configurations two or more of the data I/O component 844, the audio I/O component 846, and the video I/O component 848 are combined. The I/O components 810 may include discrete processors configured to support the various interface described below, or may include processing functionality built-in to the processor 802.

The display 840 is an output device configured to present information in a visual form. In particular, the display 840 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 840 is a liquid crystal display ("LCD") utilizing any active or passive matrix technology and any backlighting technology (if used). In some configurations, the display 840 is an organic light emitting diode ("OLED") display. Other display types are contemplated.

The touchscreen 842, also referred to herein as a "touch-enabled screen," is an input device configured to detect the presence and location of a touch. The touchscreen 842 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 842 is incorporated on top of the display 840 as a transparent layer to enable a user to use one or more touches to interact with objects or other information presented on the display 840. In other configurations, the touchscreen 842 is a touch pad incorporated on a surface of the computing device that does not include the display 840. For example, the computing device may have a touchscreen incorporated on top of the display 840 and a touch pad on a surface opposite the display 840.

In some configurations, the touchscreen 842 is a single-touch touchscreen. In other configurations, the touchscreen 842 is a multi-touch touchscreen. In some configurations, the touchscreen 842 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 842. As such, a developer may create gestures that are specific to a particular application program.

In some configurations, the touchscreen 842 supports a tap gesture in which a user taps the touchscreen 842 once on an item presented on the display 840. The tap gesture may be used for various reasons including, but not limited to, opening or launching whatever the user taps. In some configurations, the touchscreen 842 supports a double tap gesture in which a user taps the touchscreen 842 twice on an item presented on the display 840. The double tap gesture may be used for various reasons including, but not limited to, zooming in or zooming out in stages. In some configurations, the touchscreen 842 supports a tap and hold gesture in which a user taps the touchscreen 842 and maintains contact for at least a pre-defined time. The tap and hold gesture may be used for various reasons including, but not limited to, opening a context-specific menu.

In some configurations, the touchscreen 842 supports a pan gesture in which a user places a finger on the touchscreen 842 and maintains contact with the touchscreen 842 while moving the finger on the touchscreen 842. The pan gesture may be used for various reasons including, but not limited to, moving through screens, images, or menus at a controlled rate. Multiple finger pan gestures are also contemplated. In some configurations, the touchscreen 842 supports a flick gesture in which a user swipes a finger in the direction the user wants the screen to move. The flick gesture may be used for various reasons including, but not limited to, scrolling horizontally or vertically through menus or pages. In some configurations, the touchscreen 842 supports a pinch and stretch gesture in which a user makes a pinching motion with two fingers (e.g., thumb and forefinger) on the touchscreen 842 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 842. As such, the above gestures should be understood as being illustrative and should not be construed as being limiting in any way.

The data I/O interface component 844 is configured to facilitate input of data to the computing device and output of data from the computing device. In some configurations, the data I/O interface component 844 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 846 is configured to provide audio input and/or output capabilities to the computing device. In some configurations, the audio I/O interface component 846 includes a microphone configured to collect audio signals. In some configurations, the audio I/O interface component 846 includes a headphone jack configured to provide connectivity for headphones or other external speakers. In some configurations, the audio I/O interface component 846 includes a speaker for the output of audio signals. In some configurations, the audio I/O interface component 846 includes an optical audio cable out.

The video I/O interface component 848 is configured to provide video input and/or output capabilities to the computing device. In some configurations, the video I/O interface component 848 includes a video connector configured to receive video as input from another device (e.g., a video media player such as a DVD or BLURAY player) or send video as output to another device (e.g., a monitor, a television, or some other external display). In some configurations, the video I/O interface component 848 includes a High-Definition Multimedia Interface ("HDMI"), mini-HDMI, micro-HDMI, DisplayPort, or proprietary connector to input/output video content. In some configurations, the video I/O interface component 848 or portions thereof is combined with the audio I/O interface component 846 or portions thereof.

The camera 850 can be configured to capture still images and/or video. The camera 850 may utilize a charge coupled device ("CCD") or a complementary metal oxide semiconductor ("CMOS") image sensor to capture images. In some configurations, the camera 850 includes a flash to aid in taking pictures in low-light environments. Settings for the camera 850 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based.

The illustrated power components 812 include one or more batteries 852, which can be connected to a battery gauge 854. The batteries 852 may be rechargeable or disposable. Rechargeable battery types include, but are not limited to, lithium polymer, lithium ion, nickel cadmium, and nickel metal hydride. Each of the batteries 852 may be made of one or more cells.

The battery gauge 854 can be configured to measure battery parameters such as current, voltage, and temperature. In some configurations, the battery gauge 854 is configured to measure the effect of a battery's discharge rate, temperature, age and other factors to predict remaining life within a certain percentage of error. In some configurations, the battery gauge 854 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for identifying a qualified contributor of a document comprising:
    obtaining a contributor policy defining one or more thresholds for a quantity of contribution for individual users of a plurality of users associated with the document to be considered as the qualified contributor of the document;
    receiving metadata defining user activity of the plurality of users associated with the document;
    determining at least one quantity of contribution for individual contribution factors for each of the plurality of users based on the metadata defining the user activity, the one or more contribution factors for a user comprising at least one of editing time of the user on the document, a type of edits provided by the user on the document, a quantity of data in edits by the user, a frequency of edits by the user on the document, time spent on the document by the user, or an action type of the user;
    determining a contribution score for each of the plurality of users, wherein the contribution score is based on a set of the at least one quantity of contribution for individual contribution factors, and wherein one or more weights are applied to the set of the at least one quantity of contribution for individual contribution factors to generate an adjusted contribution score;
    determining, based on the adjusted contribution score for each of the plurality of users and the one or more thresholds defined in the contribution policy, a list of qualified contributors of the document comprising one or more users of the plurality of users, wherein a ranking of a user in the list of qualified contributors is modified based on the adjusted contribution score; and
    associating the list of qualified contributors with the document, wherein the list comprises the qualified contributor associated with an individual contribution score that exceeds the one or more thresholds.

2. The method of claim 1, wherein each of the plurality of users of the list of qualified contributors is ranked based on the contribution score of each of the plurality of users, wherein the method further comprises adding the list of qualified contributors to the metadata.

3. The method of claim 1, wherein determining a contribution score for each of the plurality of users comprises:
    generating a number of scores based on the contribution factors and the contributor policy;
    generating an accumulative score from the number of scores, wherein determining the list of qualified contributors comprises determining that the accumulative score exceeds a threshold defined in the contributor policy.

4. The method of claim 1, wherein the contributor policy comprises one or more of a list of contribution factors to be considered, weights of the contribution factors, or a mechanism to determine a qualified contributor based on the contribution factors.

5. The method of claim 1, wherein the contribution score collectively quantifies the set of the at least one quantity of contribution for individual contribution factors for the qualified user.

6. The method of claim 1, wherein the qualified contributors are each associated with individual contribution scores that exceed the one or more thresholds.

7. The method of claim 1, wherein the at least one quantity of contribution for individual contribution factors for each of the plurality of users are determined to identify a point of contact for the document.

8. The method of claim 1, wherein the list of qualified contributors is rendered on a display device concurrently with the document for enabling a user to identify qualified contributors of the document.

9. A system comprising:
one or more processing units; and
a computer-readable storage medium having encoded thereon computer-executable instructions to cause the one or more processing units to execute a method for identifying a qualified contributor of a document comprising
obtaining a contributor policy defining one or more thresholds for a quantity of contribution for individual ones of a plurality of users associated with the document to be considered as the qualified contributor of the document;
receiving metadata defining user activity of the plurality of users associated with the document;
determining at least one quantity of contribution for individual contribution factors for each of the plurality of users based on the metadata defining the user activity, the one or more contribution factors for a user comprising at least one of editing time of the user on the document, an amount of data in edits by the user, a frequency of edits by the user on the document, or a time spent on the document by the user;
determining a contribution score for each of the plurality of users, wherein the contribution score is based on a set of the at least one quantity of contribution for individual contribution factors, and wherein one or more weights are applied to the set of the at least one quantity of contribution for individual contribution factors to generate an adjusted contribution score;
determining, based on the adjusted contribution score for each of the plurality of users and the one or more thresholds defined in the contribution policy, a list of qualified contributors of the document comprising one or more users of the plurality of users, wherein a ranking of a user in the list of qualified contributors is modified based on the adjusted contribution score; and
modifying the metadata to include the list of qualified contributors of the document, wherein the list comprises the qualified contributor associated with an individual contribution score that exceeds the one or more thresholds.

10. The system of claim 9, wherein the method further comprises:
determining subject matter of the document;
identifying a second document containing the subject matter of the document; and
causing the second document to be presented to at least one of the qualified contributors.

11. The system of claim 9, wherein determining a contribution score for each of the plurality of users comprises:
generating a number of scores based on the contribution factors and the contributor policy;
generating an accumulative score from the number of scores, wherein determining the list of qualified contributors comprises determining that the accumulative score reaches a threshold defined in the contributor policy.

12. The system of claim 11, wherein applying the one or more weights to the set of the at least one quantity of contribution emphasizes or deemphasizes at least one contribution factor.

13. The system of claim 9, wherein the contributor policy comprises one or more of a list of contribution factors to be considered, weights of the contribution factors, or a mechanism to determine a qualified contributor based on the contribution factors.

14. A computer-readable storage medium having encoded thereon computer-executable instructions to cause one or more processing units of a computing device to execute a method for identifying a qualified contributor of a document comprising:
receiving metadata defining user activity of a user associated with the document;
determining at least one quantity of contribution for individual contribution factors for the user based on the metadata defining the user activity, the one or more contribution factors comprising at least one of editing time of the user on the document, an amount of data in edits by the user, a frequency of edits by the user on the document, or a time spent on the document by the user;
determining a contribution factor score for the user, wherein the contribution score is based on a set of the at least one quantity of contribution for individual contribution factors, and wherein one or more weights are applied to the set of the at least one quantity of contribution for individual contribution factors to generate an adjusted contribution score;
determining, based at least in part upon the adjusted contribution score for each of the plurality of users and the one or more thresholds defined in the contributor policy, that the user is a qualified contributor of the document, wherein a ranking of a user in the list of qualified contributors is modified based on the adjusted contribution score; and
in response to determining that the user is a qualified contributor of the document, adding the user to a list of qualified contributors of the document, wherein the list comprises the qualified contributor associated with an individual contribution score that exceeds the one or more thresholds.

15. The computer-readable storage medium of claim 14, wherein the contributor policy defines one or more criteria for individual ones of a plurality of users associated with a document to be considered as a qualified contributor of the document.

16. The computer-readable storage medium of claim 15, wherein the contributor policy comprises one or more of a list of contribution factors to be considered, weights of the contribution factors, or a mechanism to determine a qualified contributor based on the contribution factors.

17. The computer-readable storage medium of claim 14, wherein the method further comprises modifying the metadata to include the list of qualified contributors of the document.

18. The computer-readable storage medium of claim 14, wherein determining a contribution score for each of the plurality of users comprises:
- generating a number of scores based on the contribution factors and the contributor policy;
- generating an accumulative score from the number of scores, wherein determining the list of qualified contributors comprises determining that the accumulative score reaches a threshold defined in the contributor policy.

19. The computer-readable storage medium of claim 18, wherein applying the one or more weights to the set of the at least one quantity of contribution emphasizes or deemphasizes at least one contribution factor.

20. The computer-readable storage medium of claim 14, wherein the method further comprises:
- determining subject matter of the document;
- identifying a second document containing the subject matter of the document; and
- causing the second document to be presented to the qualified contributor.

* * * * *